United States Patent [19]

Otoguro

[11] Patent Number: 5,452,281
[45] Date of Patent: Sep. 19, 1995

[54] COMPACT DISK PLAYBACK/RECORDING SYSTEM WITH MEANS TO DISCRIMINATE IF A TAPE END IS REACHED DURING OR BETWEEN SOUND PROGRAMS

[75] Inventor: Yoshishige Otoguro, Tokyo, Japan

[73] Assignee: Goldstar Co., Ltd., Seoul, Rep. of Korea

[21] Appl. No.: 118,662

[22] Filed: Sep. 10, 1993

[30] Foreign Application Priority Data

Sep. 10, 1992 [JP] Japan ............................. 4-063444 U

[51] Int. Cl.$^6$ ................................................. G11B 3/64
[52] U.S. Cl. ........................................ 369/85; 369/58; 360/15
[58] Field of Search ....................... 369/58, 84, 85, 47, 369/13, 14, 15; 360/71, 15, 17

[56] References Cited

U.S. PATENT DOCUMENTS

| | | | |
|---|---|---|---|
| 4,916,681 | 4/1990 | Takamatsu | 369/85 X |
| 5,097,461 | 3/1992 | Majima | 369/85 X |
| 5,140,567 | 8/1992 | Kawabata et al. | 369/85 X |
| 5,197,051 | 3/1993 | Tomoda et al. | 369/85 X |
| 5,220,477 | 6/1993 | Sorihashi et al. | 360/71 |
| 5,255,250 | 10/1993 | DeWolf et al. | 369/84 X |
| 5,257,111 | 10/1993 | Kakuyama | 369/85 X |

*Primary Examiner*—Georgia Y. Epps
*Assistant Examiner*—P. W. Huber

[57] ABSTRACT

A compact disk playback/recording system having a compact disk playback apparatus and a cassette recording apparatus. The compact disk playback apparatus includes: a compact disk playback command section; a compact disk playback section for playing back a plurality of sound programs from a compact disk in response to a compact disk playback command from the compact disk playback command section; a pulse detector for detecting a stop in rotation of reels of the cassette recording apparatus in response to the absence of pulses generated when the reels are rotating; a sound detector for detecting the presence of playback sound for a predetermined time period corresponding to the travel time of a tape leader of the end of a cassette tape in response to an output signal from the pulse detector; a search section for searching for the beginning of a sound program to be played back, in response to an output signal from the sound detector indicating the tape end was reached during a sound program; and a temporary stop section for temporarily stopping the compact disk playback section in response to an output signal from the search section if the tape end is reached between sound programs. Thus, recording is begun only after the tape leader has passed on the "B" side of the cassette tape at the next subsequent sound program on the compact disk if the tape end is reached between sound programs, or is begun at the beginning of the sound program that was interrupted if the tape end was reached while said program was being recorded on the "A" side of the cassette tape.

2 Claims, 4 Drawing Sheets

COMPACT DISK PLAYBACK/RECORDING SYSTEM WITH MEANS TO DISCRIMINATE IF A TAPE END IS REACHED DURING OR BETWEEN SOUND PROGRAMS

BACKGROUND OF THE INVENTION

1. Field of the Invention

The present invention relates to a compact disk playback/recording system for recording a plurality of sound program (for example, music) played back by a compact disk playback apparatus.

2. Description of the Prior Art

Conventionally, a double cassette recorder has been known as a playback/recording system which is capable of recording a plurality of sound program played back from one tape onto another tape. Such a playback/recording system may comprise a compact disk player as a playback apparatus and a cassette recorder as a recording apparatus. In this playback/recording system, a recording position frequently reaches a tape leader of the end of a cassette tape in the middle of a playback operation of the compact disk player.

Referring to FIG. 4, there is shown a schematic block diagram of a conventional compact disk playback/recording system. As shown in this drawing, the conventional compact disk playback/recording system comprises compact disk playback command means 1 for generating a compact disk playback command, recording command means 2 for generating a synchronous recording command in response to the compact disk playback command from the compact disk playback command means 1, a compact disk playback apparatus 3 for performing a playback operation in response to the compact disk playback command from the compact disk playback command means 1, and a recording apparatus 4 for recording an output of the compact disk playback apparatus 8 in response to the synchronous recording command from the recording command means 2. Here, the compact disk playback apparatus 3 is a compact disk player and the recording apparatus 4 is a cassette tape recorder.

In operation, upon generation of the compact disk playback command from the compact disk playback command means 1 under the control of the user, the compact disk playback apparatus 3 starts the playback of a sound programs from a compact disk. At this time, the recording command means 2 generates the synchronous recording command in response to the compact disk playback command from the compact disk playback command means 1. The recording apparatus 4 records the sound played back from the compact disk on a cassette tape in response to the synchronous recording command from the recording command means 2. Therefore, the sound program can be recorded on the cassette tape at the same time as its playback from the compact disk.

However, for example, in the case where the conventional compact disk playback/recording system has an auto-reverse function of automatically reversing the cassette tape from its side A to its side B and vice versa, the recording of a sound program played back from the compact disk is stopped at a tape leader of the end of the cassette tape during playback of the same sound program from the compact disk while the same sound program is continuously played back from the compact disk by the compact disk playback apparatus. In other words, during continuous playback from the CD, the cassette tape is automatically reversed from its side A to its side B and vice versa when the tape end is reached. This results in a portion of the sound program from the compact disk not being recorded during the reversing of the cassette.

SUMMARY OF THE INVENTION

Therefore, the present invention has been made in view of the above problem, and it is an object of the present invention to provide a compact disk playback/recording system for recording a plurality of sound programs (music) played back from a compact disk on a cassette tape, in which the recording of a sound program played back from the compact disk is continuously performed with no discontinuity by recording the same sound program all over again after the lapse of a predetermined time period from the reverse of the cassette tape when a recording position reaches a tape leader of the end of the cassette tape during the playback of the same sound program from the compact disk.

In accordance with the present invention, the above and other objects can be accomplished by a provision of a compact disk playback/recording system having a compact disk playback apparatus for playing back a plurality of sound programs from a compact disk and a cassette recording apparatus for recording the plurality of sound programs played back by said compact disk playback apparatus on a cassette tape, characterized in that said compact disk playback apparatus comprises compact disk playback command means for generating a compact disk playback command under the control of the user; compact disk playback means for playing back the plurality of sound programs from the compact disk in response to the compact disk playback command from said compact disk playback command means; pulse detection means for detecting a stop in rotation of the reels of said cassette recording apparatus in response to the absence of pulses; sound detection means for detecting the presence of sound, the recording of which has been stopped, for a predetermined time period corresponding to the passing of a tape leader of the end of the cassette tape in response to an output signal from said pulse detection means search means for searching for a "sound head" (i.e. the beginning) of a sound program to be played back, in response to an output signal from said sound detection means; temporary stop means for temporarily stopping said compact disk playback means in response to an output signal from said search means; wherein said cassette recording apparatus comprises pulse generation means for counting the number of rotations of the reels, generating pulses corresponding to the counted number and outputting the generated pulses to said pulse detection means; and reverse means for reversing the cassette tape from its one side to its other side in response to the output signal from said pulse detection means; whereby the cassette tape is reversed from its one side to its other side when a recording position reaches the tape leader of the end of the cassette tape in the middle of the playback of one of the plurality of sound programs from the compact disk and the recording of the playedback sound program that was stopped at the end of one side of the cassette tape is performed all over again (i.e., from the "sound head") at the other side of the cassette tape after a lapse of a predetermined time period from the reverse of the cassette tape.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
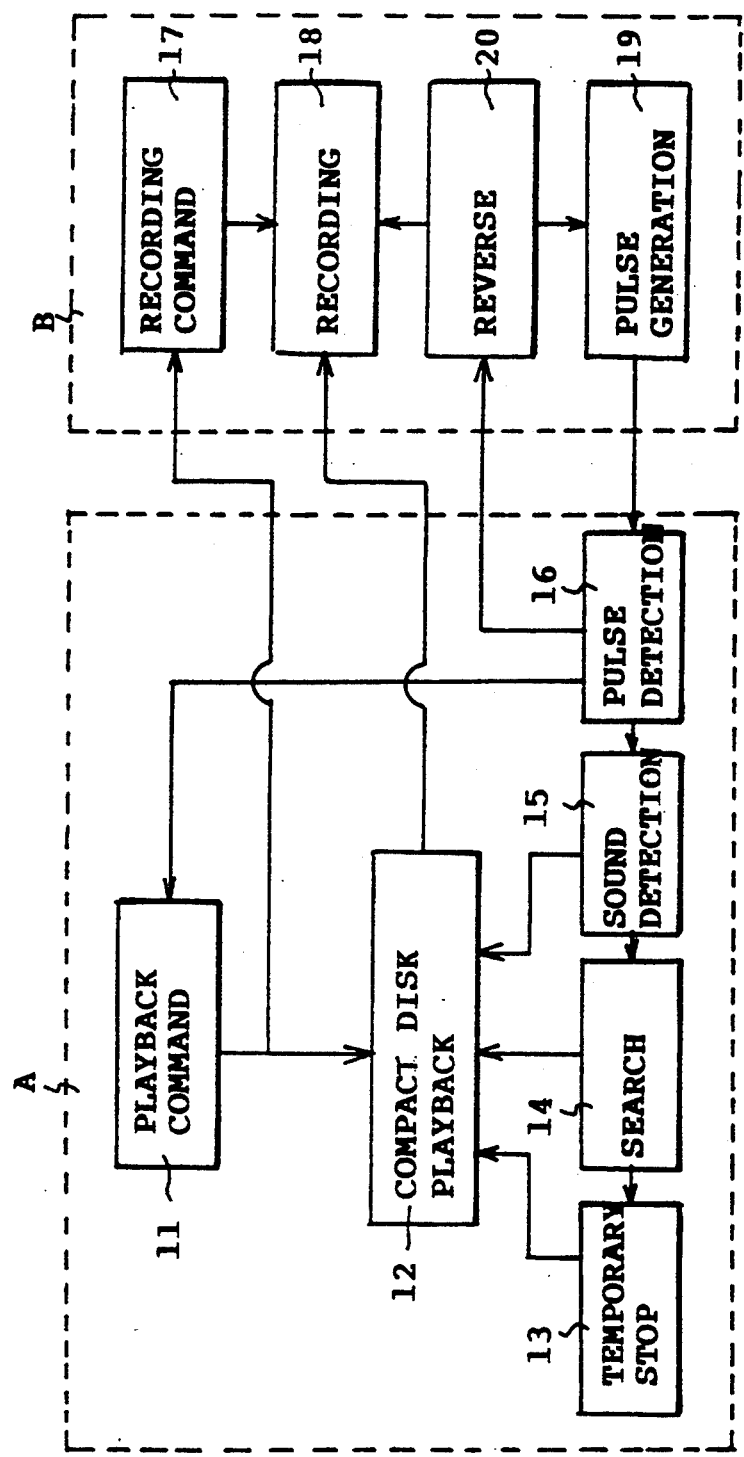
FIG. 1 is a block diagram of a compact disk playback/recording system in accordance with the present invention.

Referring to FIG. 1, there is shown a block diagram of a compact disk playback/recording system in accordance with the present invention. As shown in this drawing, the compact disk playback/recording system comprises a compact disk player A as a playback apparatus and a cassette recorder B as a recording apparatus.

The compact disk player A comprises: compact disk playback command means 11 for generating a compact disk playback command; compact disk playback means 12 for playing back a plurality off sound programs from a compact disk in response to the compact disk playback command from the compact disk playback command means 11; pulse detection means 16 for detecting a stop in rotation of reels of the cassette recorder B in response to the absence of pulses; sound detection means 15 for detecting the presence of sound, the recording of which has been stopped, for a predetermined time period (that corresponding to the passing of a tape leader of the end of a cassette tape) in response to an output signal from the pulse detection means 16; search means 14 for searching for the sound head of a sound program to be played back, in response to an output signal from the sound detection means 15, and temporary stop means 13 for temporarily stopping the compact disk playback means 12 in response to an output signal from the search means 14.

The cassette recorder B comprises recording command means 17 for generating a recording command in response to the compact disk playback command from the compact disk playback command means 11, recording means 18 for recording the plurality of sound programs played back by the compact disk playback means 12 on the cassette tape in response to the recording command from the recording command means 17, pulse generation means 19 for counting number of the rotations of the reels, generating pulses corresponding to the counted number and outputting the generated pulses to the pulse detection means 16, and reverse means 20 for reversing the cassette tape from its one side to its other side in response to the output signal from the pulse detection means 16. The pulse generation means 19 may include a magnet and a hall element, for example.

The operation of the compact disk playback/recording system with the above-mentioned construction in accordance with the present invention will hereinafter be described in detail with reference to FIGS. 2 and 3.

Figure 2:
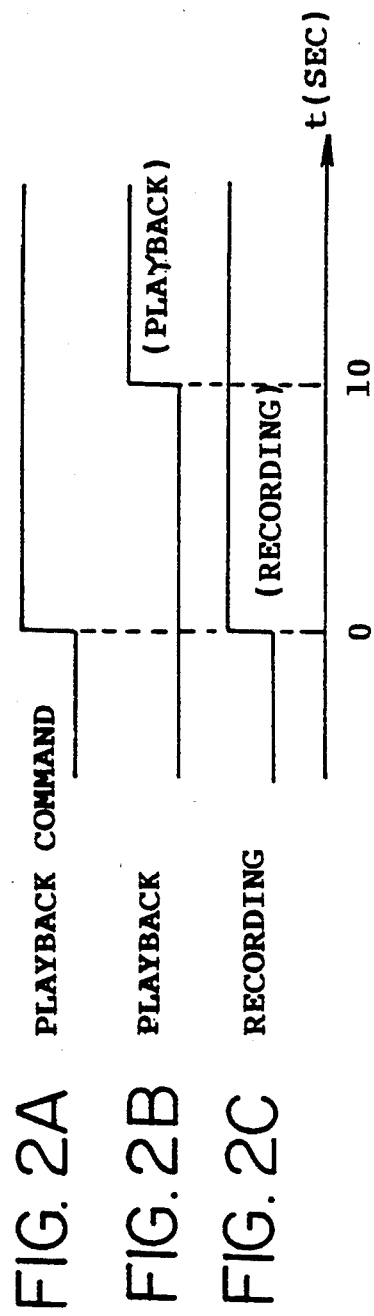
FIG. 2 is a timing diagram when playback and recording operations are started, in accordance with the present invention.
Figure 3:
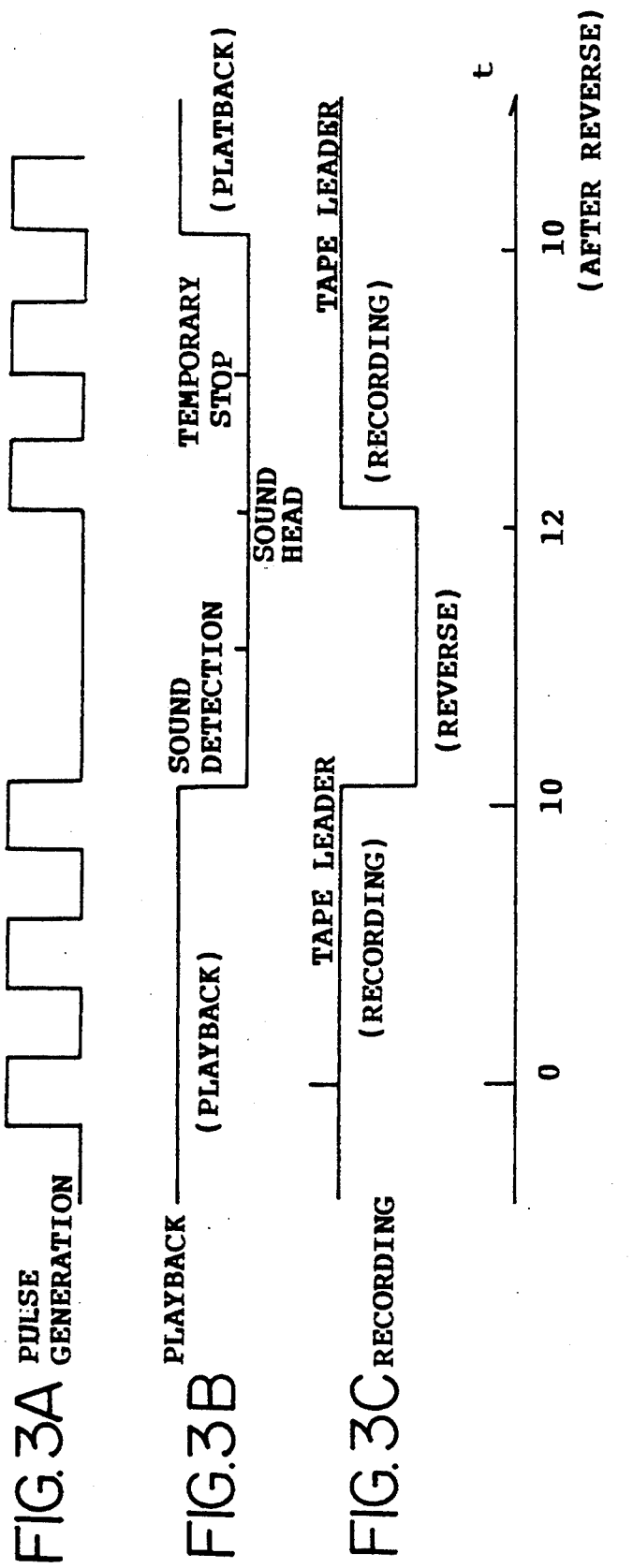
FIG. 3 is a timing diagram of recording a sound program played back from a compact disk when a cassette tape is reversed from its one side to its other side, in accordance with the present invention.
Figure 4:
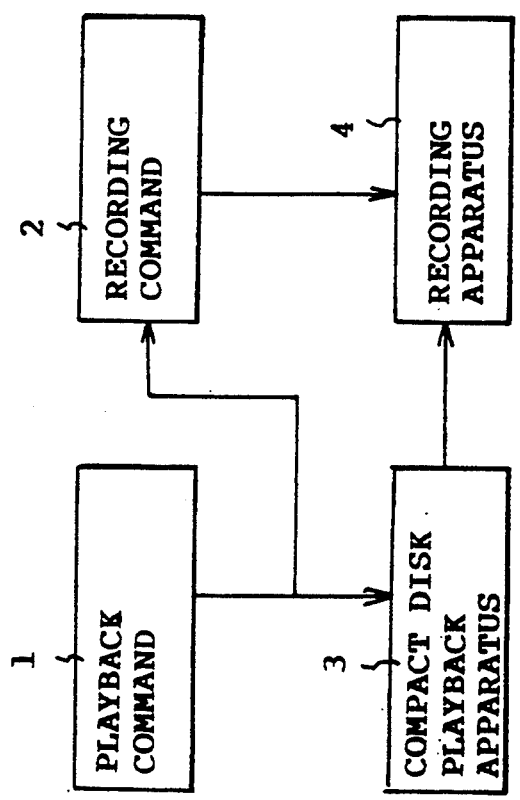
FIG. 4 is a schematic block diagram of a conventional compact disk playback/recording system.

FIG. 2 is a timing diagram when the playback and recording operations are started, in accordance with the present invention, and FIG. 3 is a timing diagram of recording sound played back from the compact disk when the cassette tape is reversed from its one side to its other side, in accordance with the present invention. First, the compact disk on which the plurality of sound programs have been recorded is inserted into the compact disk playback means 12 in the compact disk player A and the cassette tape is inserted into the recording means 18 in the cassette recorder B.

Then, the compact disk playback command means 11, which may include a push button, sends the compact disk playback command to the compact disk playback means 12 and also to the recording command means 17 under the control of the user. In response to the compact disk playback command from the compact disk playback command means 11, the compact disk playback means 12 starts the playback operation after the lapse of a predetermined time period (10 sec as shown in FIG. 2). The sound played back by the compact disk playback means 12 is transferred to the recording means 18.

The recording command means 17 generates the recording command to the recording means 18 in response to the compact disk playback command from the compact disk playback command means 11. The recording means 18 is turned into a recordable state upon receiving the recording command from the recording command means 17 and then starts the recording of the sound played back by the compact disk playback means 12. In this case, a travelling time of a tape leader of the cassette tape is 10 sec (the maximum length of the tape leader is 350 mm) in accordance with the preferred embodiment of the present invention. The compact disk playback means 12 is released from its temporary stop state after the lapse of 10 sec from the start of the cassette tape and then transfers the playedback sound to the recording means 18.

As shown in FIG. 3, when a recording position reaches the end of the cassette tape as the recording of the sound program played back from the compact disk is advanced, the pulse detection means 16 detects absence of pulses from the pulse generation means 19 (i.e., a stop in the rotation of the reels of the cassette recorder B) and outputs a signal to the reverse means 20 and the sound detection means 15.

The sound detection means 15 detects the presence of playback sound from a sound program, the recording of which has been stopped, for 10 sec (corresponding to the passing of a tape leader of the end of the cassette tape) in response to the output signal from the pulse detection means 16. If the sound detection means 15 detects the presence of playback sound for 10 sec, the search means 14 searches for the sound head of the present sound program and informs the compact disk playback means 12 of the location thereof. On the contrary, if the sound detection means 15 detects the absence of playback sound for 10 sec, the search means 14 controls the temporary stop means 13 to force the compact disk playback means 12 to remain at its temporary stop state at the head of the subsequent sound program.

On the other hand, in response to the output signal from the pulse detection means 16, the reverse means 20 reverses the cassette tape from its one side to its other side, thereby causing the recording means 18 to be turned into the recordable state. After the lapse of 10 sec, the compact disk playback means 12 is released from its temporary stop state and then transfers the played-back sound to the recording means 18. As a result, in the case where the recording of the sound program played back from the compact disk is stopped on one side of the cassette tape, the sound recording is performed all over again on the other side of the cassette tape. Therefore, the recording of the sound program played back from the compact disk is continuously performed with no discontinuity even when the recording position reaches the tape leader of the end of the cassette tape during the playback of the same sound program from the compact disk.

As apparent from the above description, according to the present invention, a recording of the played-back sound program that is interrupted at the end of one side of the cassette tape can be performed from the beginning of the same sound program at the beginning of the other side of the cassette tape, with the use of only the pulse generation means. Therefore, the recording of the sound played back from the compact disk can be continuously performed with no discontinuity even when the recording position reaches the tape leader of the end of the cassette tape during the playback of the sound program from the compact disk.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compact disk playback/recording system having a compact disk playback apparatus for playing back a plurality of sound programs from a compact disk and a cassette recording apparatus for recording the plurality of sound programs played back by said compact disk playback apparatus onto a cassette tape, characterized in that said compact disk playback apparatus comprises:

compact disk playback command means for generating a compact disk playback command under the control of the user;

compact disk playback means for playing back the plurality of sound programs from the compact disk in response to the compact disk playback command from said compact disk playback command means;

pulse detection means for detecting a stop in rotation of reels of said cassette recording apparatus by the absence of pulses generated when the reels are rotating;

sound detection means for detecting the presence of sound for a predetermined time period, corresponding to a passing of a tape leader of the end of the cassette tape, after receipt of an output signal from said pulse detection means;

search means for searching for the beginning of the present sound program, in response to an output signal from said sound detection means; and temporary stop means for temporarily stopping said compact disk playback means in response to an output signal from said search means, said output signal being generated if the sound detection means detects the absence of playback sound for a predetermined time period; and said cassette recording apparatus comprises:

pulse generation means for counting the number of rotations of the reels, generating pulses corresponding to the counted number and outputting the generated pulses to said pulse detection means; and reverse means for reversing the cassette tape from its one side to its other side in response to the output signal from said pulse detection means;

said cassette tape being reversed from its one side to its other side when a recording position reaches the tape leader of the end of the cassette tape during playback of one of the plurality of sound programs from the compact disk, in which case said one sound program is recorded from the beginning thereof on the other side of the cassette tape after the lapse of a predetermined time period from the reverse of the cassette tape, or if the cassette tape is reversed from its one side to its other side when a recording position reaches the tape leader of the end of the cassette tape during absence of sound detected by said sound detection means for a predetermined period, said search means controls said temporary stop means to force the compact disk playback means to remain at the head of the subsequent sound program.

2. A compact disk playback/recording system having a compact disk playback apparatus for playing back a plurality of sound programs from a compact disk and a cassette recording apparatus for recording the plurality of sound programs played back by said compact disk playback apparatus onto a cassette tape, characterized in that said compact disk playback apparatus comprises:

compact disk playback command means for generating a compact disk playback command under the control of the user;

compact disk playback means for playing back the plurality of sound programs from the compact disk in response to the compact disk playback command from said compact disk playback command means;

pulse detection means for detecting a stop in rotation of reels of said cassette recording apparatus by the absence of pulses generated when the reels are rotating;

sound detection means for detecting the presence of sound for a predetermined time period, after receipt of an output signal from said pulse detection means;

search means for searching for the beginning of the present sound program, in response to an output signal from said sound detection means; and temporary stop means for temporarily stopping said compact disk playback means in response to an output signal from said search means, said output signal from said search means being generated if the sound detection means detects the absence of playback sound for a predetermined time period; and said cassette recording apparatus comprises:

pulse generation means for counting the number of rotations of the reels, generating pulses corresponding to the counted number and outputting the generated pulses to said pulse detection means; and reverse means for reversing the cassette tape from its one side to its other side in response to the output signal from said pulse detection means;

said cassette tape being reversed from its one side to its other side when a recording position reaches the tape leader of the end of the cassette tape, and (1) if such reversal occurs during playback of one of the plurality of sound programs from the compact disk, recording of said sound program is performed from the beginning thereof on the other side of the cassette tape after the lapse of a predetermined time period from the reversal of the cassette tape, or (2), if such reversal occurs other than during playback of one of the plurality of sound programs, recording is performed on the other side of the cassette tape beginning with the next subsequent sound program from the compact disk after the lapse of a predetermined time period from the reversal of the cassette tape.

* * * * *